US010528599B1

(12) United States Patent
Pandis et al.

(10) Patent No.: US 10,528,599 B1
(45) Date of Patent: Jan. 7, 2020

(54) TIERED DATA PROCESSING FOR DISTRIBUTED DATA

(71) Applicant: Amazon Technologies, Inc., Seattle, WA (US)

(72) Inventors: Ippokratis Pandis, Menlo Park, CA (US); Mengchu Cai, San Jose, CA (US); Martin Grund, Lafayette, CA (US); Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 456 days.

(21) Appl. No.: 15/382,326

(22) Filed: Dec. 16, 2016

(51) Int. Cl.
*G06F 16/28* (2019.01)
*H04L 29/08* (2006.01)
*G06F 16/22* (2019.01)
*G06F 16/248* (2019.01)
*G06F 16/2455* (2019.01)

(52) U.S. Cl.
CPC ......... *G06F 16/285* (2019.01); *G06F 16/22* (2019.01); *G06F 16/248* (2019.01); *G06F 16/2455* (2019.01); *H04L 67/1097* (2013.01)

(58) Field of Classification Search
CPC ............ G06F 16/245; G06F 16/24542; G06F 16/2455; G06F 16/2471; G06Q 10/0631
See application file for complete search history.

(56) References Cited

U.S. PATENT DOCUMENTS

| | | | |
|---|---|---|---|
| 6,289,334 B1 | 9/2001 | Reiner et al. | |
| 6,615,203 B1 | 9/2003 | Lin et al. | |
| 7,877,381 B2 * | 1/2011 | Ewen | G06F 16/24542 707/719 |
| 7,984,043 B1 | 7/2011 | Waas | |
| 8,447,757 B1 * | 5/2013 | Cox | G06F 16/2471 707/720 |
| 8,838,596 B2 | 9/2014 | Li | |
| 9,633,076 B1 * | 4/2017 | Morton | G06F 16/248 707/719 |
| 2012/0331126 A1 | 12/2012 | Abdul-Razzak et al. | |
| 2013/0058215 A1 * | 3/2013 | Koponen | H04L 12/4633 370/241 |
| 2013/0151926 A1 | 6/2013 | Leggette et al. | |

(Continued)

OTHER PUBLICATIONS

U.S. Appl. No. 15/382,334, filed Dec. 16, 2016, Ippokratis Pandis et al.

*Primary Examiner* — Yuk Ting Choi
(74) *Attorney, Agent, or Firm* — Robert C. Kowert; Kowert, Hood, Munyon, Rankin & Goetzel, P.C.

(57) ABSTRACT

Data processing engines implement tiered data processing for distributed data in local and remote data stores. Requests to access distributed data including a data object in a remote data store are received at a data processing engine. A query plan is generated to service the access request. Different operations in the query plan are identified and assigned to one or more remote query processing engines that may access the remote data object. Requests to perform the different operations are sent to the one or more remote query processing engines. A final result is generated for the request based on the results received for the different operations from the remote query processing engine and results from operations performed with respect to locally stored data.

20 Claims, 12 Drawing Sheets

(56) References Cited

U.S. PATENT DOCUMENTS

| | | | |
|---|---|---|---|
| 2013/0205028 A1* | 8/2013 | Crockett | G06F 9/5027 709/226 |
| 2013/0318068 A1* | 11/2013 | Apte | G06F 15/16 707/718 |
| 2015/0095308 A1 | 4/2015 | Kornacker et al. | |
| 2016/0055210 A1 | 2/2016 | Beavin et al. | |

* cited by examiner

US 10,528,599 B1

TIERED DATA PROCESSING FOR DISTRIBUTED DATA

BACKGROUND

As the technological capacity for organizations to create, track, and retain information continues to grow, a variety of different technologies for managing and storing the rising tide of information have been developed. Different storage systems, database systems, and other data processing platforms may provide clients with standard or customized configurations of hardware and software to manage stored information. Because many data management and storage solutions are available, it is difficult for users to select a data management and solution that satisfies current storage needs without blocking future data accessibility as data management and storage solutions change. Therefore, data often becomes stored or distributed across different locations, in different formats, making subsequent attempts to analyze the distributed data collectively difficult to perform.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of tiered data processing for distributed data are described herein. Data is generated, collected, and stored in diverse locations and formats, making attempts to analyze related data distributed in such a manner difficult to perform. A common solution relies upon transforming and transmitting data to a common location and format so that single system can perform processing on the gathered information. However, the complexity and cost of transmitting and transforming data to perform such analyses of distributed data can become so high as to discourage attempts to analyze distributed data.

Another common solution is to implement federated data processing for distributed data, so that data processing may be distributed across different data processing engines which access the different data objects in different locations. While federated data processing may somewhat reduce the cost or complexity barriers to analyzing distributed data sets, federate data processing may still rely upon the individual execution decisions of the different data processing engines. For example, different data processing engines may perform data processing operations (e.g., searches, calculations, joins, etc.) and then transmit the data to a data processing engine that generates a combined, final result. Such a technique, however, leaves out further processing optimizations that could be achieved by a centralized execution plan.

Figure 1:
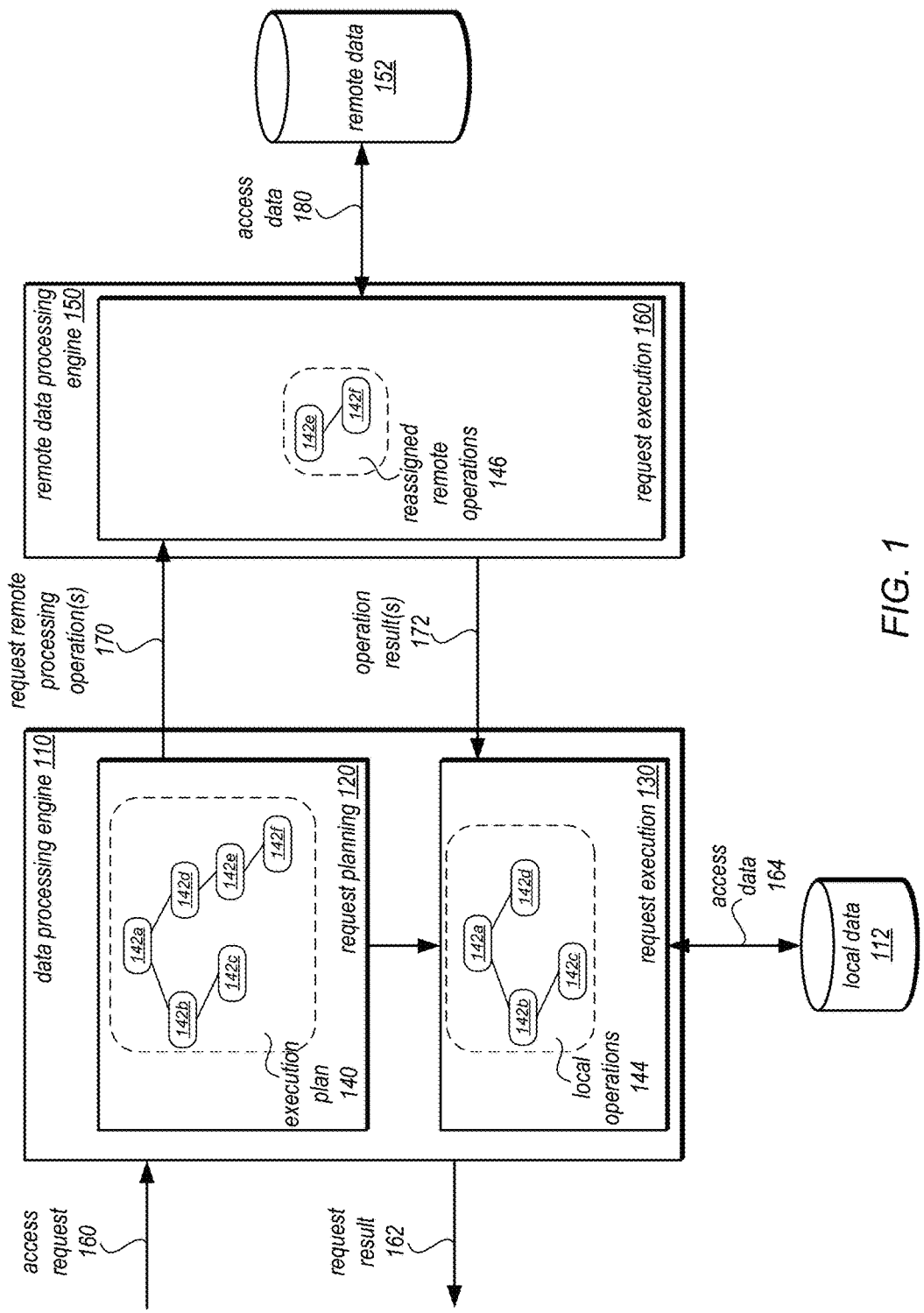
FIG. 1 illustrates a logical block diagram of tiered data processing for distributed data, according to some embodiments.

In various embodiments, tiered data processing may be implemented to generate a centralized execution plan for performing an access request directed to a distributed data that leverages the performance improvements of distributed processing without sacrificing the execution performance optimizations that may be obtained assigning data processing operations to remote data processing engines. For example, in at least some embodiments, data processing operations that could be performed locally could be reassigned for execution at remote data processing engines in order to reduce the amount of results data that is transmitted back. FIG. 1 illustrates a logical block diagram of tiered data processing for distributed data, according to some embodiments.

Data processing engine 110 may provide access to data stored locally with respect to data processing engine 110, such as local data 112, and/or data stored remotely with respect to data processing engine 110, such as remote data 152. Data processing engine 110 may utilize tiered data processing for remote data 152, by interacting with remote data processing engine 150 (which may have faster access 180 to remote data 152), rather than obtaining remote data 152 for local access. In some embodiments remote data 152 may be stored in a data format that is not supported by data processing engine 110. However, remote data processing engine 150 may support the data format of remote data 152.

Data processing engine 110 may receive an access request 160. For example, access request 160 may be a request to read, obtain, search, analyze, or otherwise perform operations that access data in a distributed data set (e.g., local data 112 and remote data 152). A distributed data set may be data that is stored in local and remote storage. For example, the distributed data set may include one or multiple database tables (or partitions of database tables) that are separately stored (e.g., by storing partitions of database tables that are infrequently accessed in remote storage). Data processing engine 110 may implement request planning 120 to generate an execution plan 140. For example, the execution plan may include the various data processing operations that are performed to execute the request (e.g., join, scan, filter, aggregate, search, project, group, limit, etc.). A plan may be a query tree or a plan node tree, as illustrated by plan nodes 142a, 142b, 142c, 142d, 142e, and 142f.

Request planning 120 may implement various techniques to assign operations for local execution 144 and remote execution 146. As discussed below with regard to FIGS. 6-8B, different techniques may be implemented to reassign operations that could be executed locally at request execution 130 to remote request execution 160. For example, filter operations may be reassigned as remote operations 146 that are performed as part of (or in addition to) a scan operation of remote data 152. Cost-based optimization techniques, greedy selection techniques, or various other reassignment techniques may be implemented to push down or reassign operations to remote data processing engine 150 for execution.

Once a modified plan is generated, data processing engine 110 may provide location operations 144 to local request execution 130 which may access 164 local data 112 to carry out portions of the operations. Additionally, data processing engine 110 may request remote processing operation(s) 170 to instruct the performance of reassigned remote operations 146 at remote data processing engine 150. As discussed below with regard to FIGS. 5 and 9, the requested operations may specify the data object(s) to be accessed, the operation(s) to be performed, access credentials for accessing the data object(s), encryption or compression schemes applied to the object, and/or a format for reporting operation result(s) 172. In this way, remote data processing engine may implement request execution 160 without further query planning, processing, or analysis. Instead, remote data processing engine 150 may offer processing functionality that is optimized for fast execution of specified operations.

Operation result(s) 172 may be provided to data processing engine 110 as a single result or a stream of results, as discussed below with regard to FIG. 9. Local request execution 130 may use operation result(s) 172 and carry out the generation of the final request result 162 according to the execution plan 140. The final request result 162 may then be provided in response to access request 160.

Please note that the previous description of tiered storage for data processing is a logical illustration and thus is not to be construed as limiting as to the implementation of a data processor, a data store, a data set (or portions thereof). For example, data processor 110 may be implemented as a cluster or group of nodes that perform data processing.

This specification begins with a general description of a provider network that implements data processing and/or storage services that utilize tiered data processing for distributed data. Then various examples of multiple data processors, such as a data warehouse service and a format independent data processing service, including different components/modules, or arrangements of components/module that may be employed as part of implementing the data processors are discussed. A number of different methods and techniques to implement tiered data processing for distributed data are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
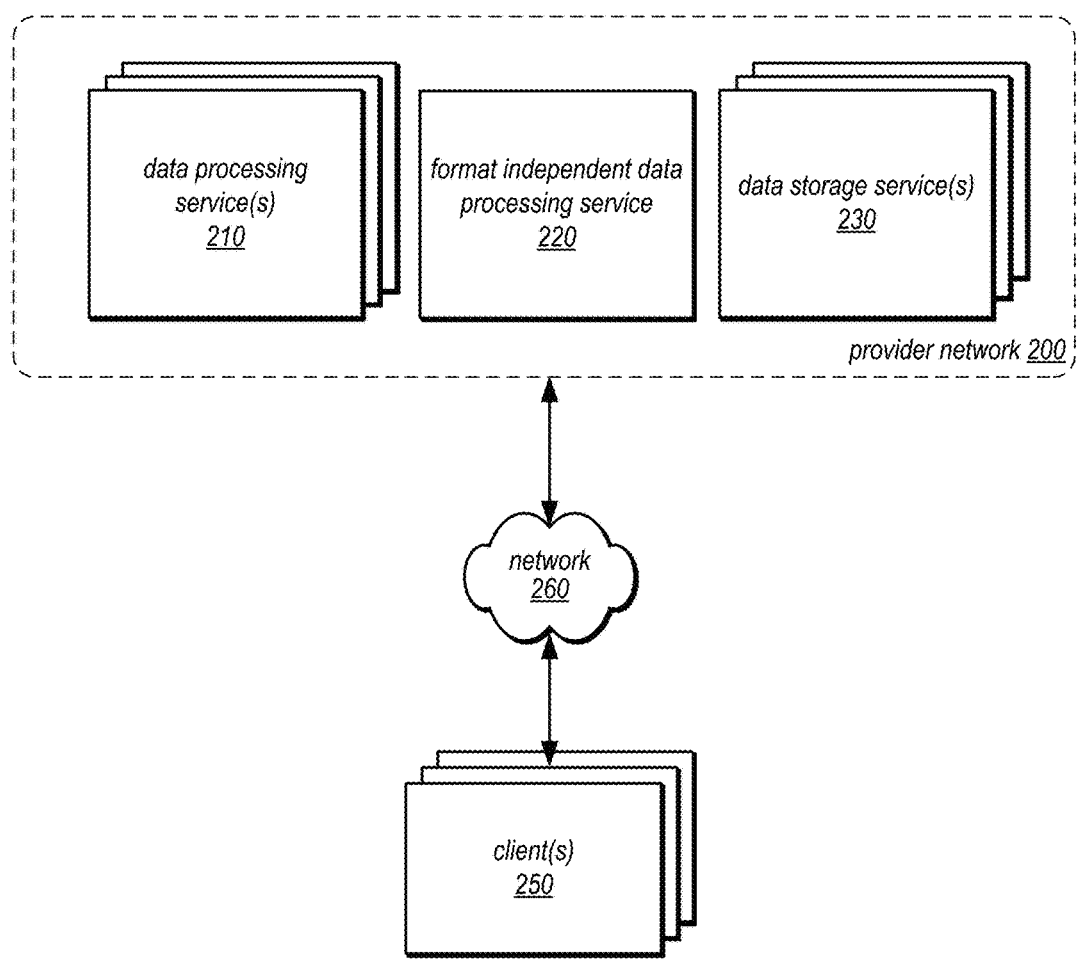
FIG. 2 is a logical block diagram illustrating a provider network offering data processing services that utilize a format independent data processing service to perform tiered data processing for data stored in data storage services, according to some embodiments.

FIG. 2 is a logical block diagram illustrating a provider network offering data processing services that utilize a format independent data processing service to perform tiered data processing for data stored in data storage services, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and storage services offered by the provider network 200. In some embodiments, provider network 200 may implement various computing resources or services, such as data processing service(s) 210, (e.g., a map reduce service, a data warehouse service, and other large scale data processing services or database services), format independent data processing service 220, and data storage services 230 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given system or service component (e.g., a component of data processing service 210, format independent data processing service 220, or data storage service 230) may be implemented by a particular node or may be distributed across several nodes. In some embodiments, a given node may implement the functionality of more than one service system component (e.g., more than one data store component).

Data processing services 210 may be various types of data processing services that perform general or specialized data processing functions (e.g., anomaly detection, machine learning, data mining, big data querying, or any other type of data processing operation). For example, in at least some embodiments, data processing services 210 may include a map reduce service that creates clusters of processing nodes that implement map reduce functionality over data stored in the map reduce cluster as well as data stored in one of data storage services 230. In another example, data processing service(s) 210 may include various types of database services (both relational and non-relational) for storing, querying, and updating data. Such services may be enterprise-class database systems that are highly scalable and extensible. Queries may be directed to a database in data processing service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing service(s) 210 may implement, in some embodiments, a data warehouse service, such as discussed below with regard to FIG. 3 that utilizes another data processing service, such as format independent data processing service 220, to execute portions of queries or other access requests with respect to data that is stored in a remote data store, such as data storage service(s) 230 (or a data store external to provider network 200) to implement tiered data processing for distributed data sets.

Format independent data processing service 220, as discussed in more detail below with regard to FIGS. 3-8B, may provide a service supporting many different data or file formats for data stored in a centralized data store, like one (or more) of data storage service(s) 230. Instead of reformatting (if the format of data in remote storage is not supported by the data processing service(s) 210) and moving data from data storage service(s) 230 into the data processing service(s) 210, format independent data processing service 220 may efficiently read data from data storage service(s) 230 according to the data format in which the data is already stored in data storage service(s) 230. Format independent data processing service may perform requested operations, such as scan operations that filter or project data results, aggregation operations that aggregate data values and provide partial or complete aggregation results, sorting, grouping, or limiting operations that organize or reduce the determined data results from data in data storage service(s) 230 in order to minimize the amount of data transferred out of data storage service(s) 230. For example, format independent data processing service 220 may execute different operations that are part of a larger query plan generated at a data processing service 210 (such as discussed above with regard to FIG. 1 and below with regard to FIGS. 5-8B) and provide results to the data processing service 210 by relying upon requests from data processing service(s) 210 to determine the different operations to perform. In this way, format independent data processing service 220 may be implemented as a dynamically scalable and stateless data processing service that is fault tolerant without the need to support complex query planning and execution for multiple different data formats. Instead, format independent data processing service 230 may offer a set of data processing capabilities to access data stored in a wide variety of data formats (which may not be supported by different data processing service(s) 210) that can be programmatically initiated on behalf of another data processing client, such as data processing service 210.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphical user interfaces. For example, format independent data processing service 220 may access data objects stored in data storage services via the programmatic interfaces (as discussed below with regard to FIG. 9).

Generally speaking, clients 250 may encompass any type of client configurable to submit network-based requests to provider network 200 via network 260, including requests for storage services (e.g., a request to create, read, write, obtain, or modify data in data storage service(s) 230, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of data processing service(s) 210, format independent data processing service 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service, like data warehouse service 300 in FIG. 3 below) or data stored in a data lake hosted in data storage service(s) 230 by performing tiered data processing between the data processing service 210 and format independent data processing service 220 (as discussed below with regard to FIGS. 5-9).

Clients 250 may convey network-based services requests (e.g., access requests to read or write data may be directed to data in data storage service(s) 230, operations, tasks, or jobs, being performed as part of data processing service(s) 220, or to interact with data catalog service 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
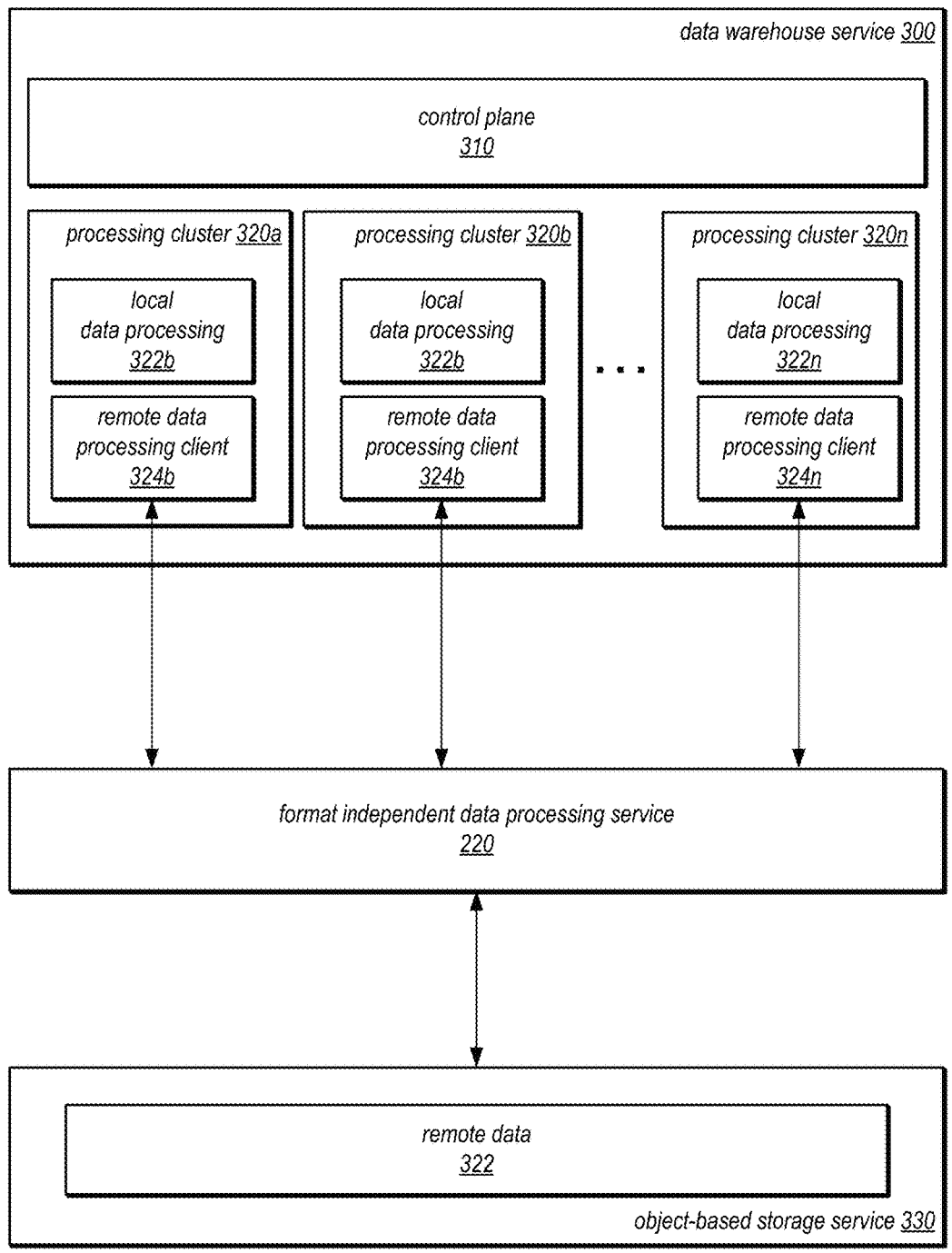
FIG. 3 is a logical block diagram of a data warehouse service that utilizes a format independent data processing service to perform tiered data processing for data stored outside of the data warehouse service, according to some embodiments.

In at least some embodiments, one of data processing service(s) 220 may be a data warehouse service. FIG. 3 is a logical block diagram of a data warehouse service that utilizes a format independent data processing service to perform tiered data processing for data stored outside of the data warehouse service. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally configured or adapted to implement embodiments for various other types of relational database systems, such as row-oriented database systems. Therefore, the following examples are not intended to be limiting as to various other types or formats of relational database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 2000 described below with regard to FIG. 11. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300.

As discussed above, various clients (or customers, organizations, entities, or users) may wish to store and manage data using a data management service. Processing clusters may respond to various requests, including write/update/ store requests (e.g., to write data into storage) or queries for data (e.g., such as a Structured Query Language request (SQL) for particular data), as discussed below with regard to FIG. 5, along with many other data management or storage services. Multiple users or clients may access a processing cluster to obtain data warehouse services. In at least some embodiments, a data warehouse service 300 may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 320a, 320b, through 320n, hosted by the data warehouse service 300 may provide an enterprise-class database query and management system that allows users to send data processing requests to be executed by the clusters 320, such as by sending a data processing request to a cluster control interface implemented by the network-based service. Processing clusters 320 may perform data processing operations with respect to data stored locally in a processing cluster, as well as remotely stored data. For example, object-based storage service 330 may be a data storage service 230 implemented by provider network 200 that stores remote data 322. Queries sent to a processing cluster 320 may be directed to local data stored in the processing cluster and/or remote data 322. Therefore, processing clusters may implement local data processing, such as local data processing 322a, 322b, and 322c (discussed below with regard to FIGS. 5-8B) to plan and execute the performance of queries with respect to local data in the processing cluster, as well as a remote data processing client, such as remote data processing clients 324a, 324b, and 324c, to direct execution of different operations determined as part of the query plan generated at the processing cluster that are assigned to format independent data processing service 220 with respect to processing remote data 322.

Scaling clusters 320 may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Figure 4:
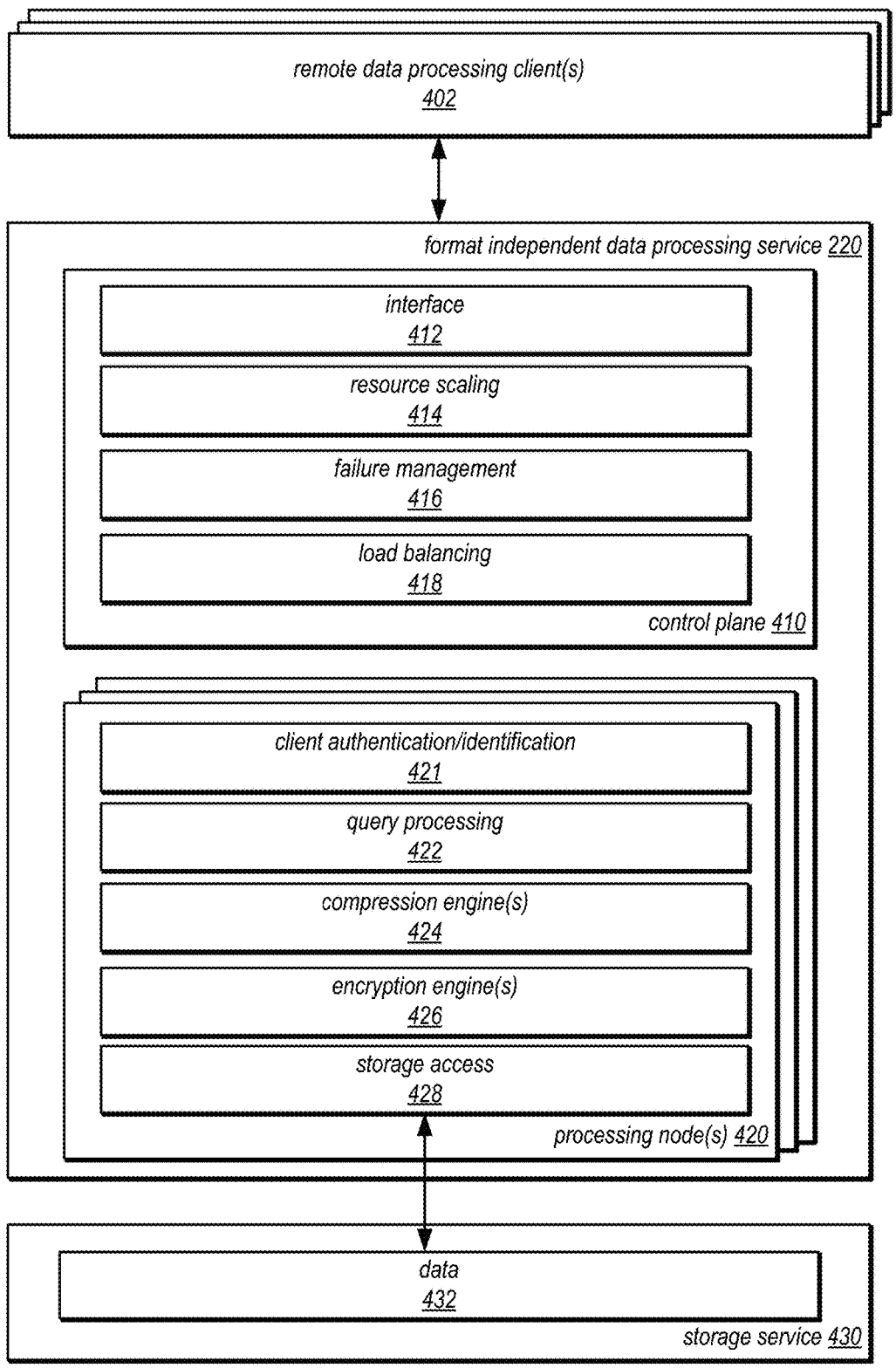
FIG. 4 is a logical block diagram illustrating a format independent data processing service, according to some embodiments.

FIG. 4 is a logical block diagram illustrating a format independent data processing service, according to some embodiments. As noted above in FIG. 2, format independent data processing service 220 may receive requests to perform processing operations with respect to data stored 432 stored in a data storage service. Processing requests may be received from a client, such as remote data processing client(s) 402 (which may another data processing service 210, like data warehouse service 300 or another data processing client, such as a database engine/cluster or map reduce cluster implemented outside of provider network 200 and communicating with format independent data processing service 220 in order to process queries with respect to data stored within provider network 200 in a data storage service 230 or to process data stored outside of provider network 200 (when the data is made accessible to format independent data processing service 220).

Format independent data processing service 220 may implement a control plane 410 and multiple processing node(s) 420 to execute processing requests received from remote data processing client(s) 402. Control plane 410 may arbitrate, balance, select, or dispatch requests to different processing node(s) 420 in various embodiments. For example, control plane 410 may implement interface 412 which may be a programmatic interface, such as an application programming interface (API), that allows for requests to be formatted according to the interface 412 to programmatically invoke operations. In some embodiments, the API may be defined to allow operation requests defined as objects of code generated at and sent from remote data processing client(s) 402 (based on a query plan generated at remote data processing client(s) 402) to be compiled or executed in order to perform the assigned operations at format independent data processing service 220.

In some embodiments, format independent data processing service 220 may implement load balancing 418 to distribute remote processing requests across different processing node(s) 420. For example, a remote processing request received via interface 412 may be directed to a network endpoint for a load-balancing component of load balancing 418 (e.g., a load balancing server or node) which may then dispatch the request to one of processing node(s) 420 according to a load balancing scheme. A round-robin load balancing, for instance, may be used to ensure that remote data processing requests are fairly distributed amongst processing node(s) 420. However, various other load-balancing schemes may be implemented. As format independent data processing service 220 may receive many remote data processing requests from multiple remote data processing client(s) 402, load balancing 418 may ensure that incoming requests are not directed to busy or overloaded processing node(s) 420.

Format independent data processing service 220 may also implement resource scaling 414. Resource scaling 414 may detect when the current request rate or workload upon a current number of processing node(s) 420 exceeds or falls below over-utilization or under-utilization thresholds for processing nodes. In response to detecting that the request rate or workload exceeds an over-utilized threshold, for example, then resources scaling 414 may provision, spin up, activate, repurpose, reallocate, or otherwise obtain additional processing node(s) 420 to processing received remote data processing requests.

Similarly, the number of processing node(s) 420 could be reduced by resource scaling 414 in the event that the request rate or workload of processing node(s) falls below the under-utilization threshold.

Format independent data processing service 220 may also implement failure management 416 to monitor processing node(s) 420 and other components of format independent data processing service 220 for failure or other health or performance states that may need to be repaired or replaced. For example, failure management 416 may detect when a processing node fails or becomes unavailable (e.g., due to a network partition) by polling processing node(s) 420 to obtain health or performance status information. Failure management may initiate shutdown or halting of processing at failing processing node(s) 420 and provision replacement processing node(s) 420.

Figure 11:
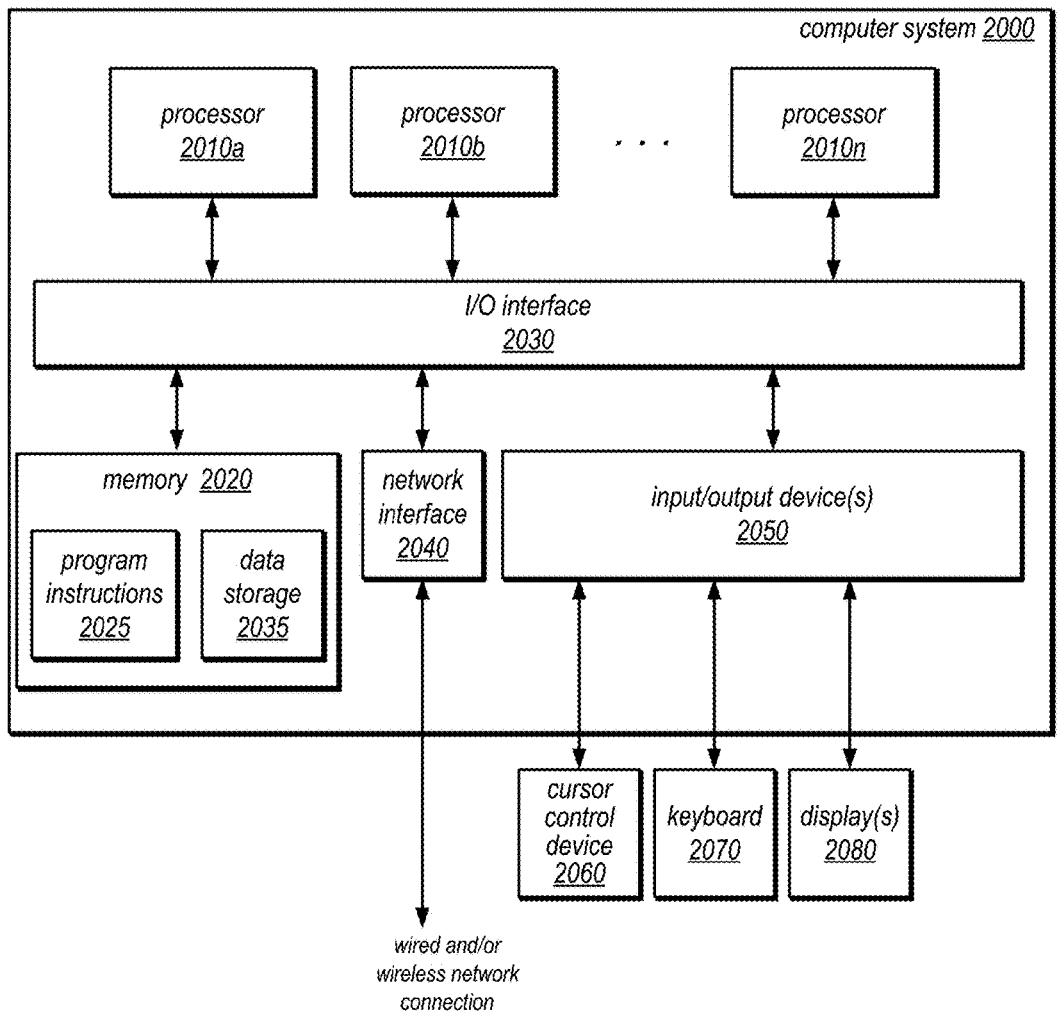
FIG. 11 illustrates an example system configured to implement the various methods, techniques, and systems described herein, according to some embodiments.

Processing node(s) 420 may be implemented as separate computing nodes, servers, or devices, such as computing systems 2000 in FIG. 11, to perform data processing operations on behalf of remote data processing client(s) 402. Processing node(s) 420 may implement stateless, in-memory processing to execute processing operations, in some embodiments. In this way, processing node(s) 420 may have fast data processing rates. Processing node(s) 420 may implement client authentication/identification 421 to determine whether a remote data processing client 402 has the right to access data 432 in storage service 430. For example, client authentication/identification 421 may evaluate access credentials, such as a username and password, token, or other identity indicator by attempting to connect with storage service 430 using the provided access credentials. If the connection attempt is unsuccessful, then the data processing node 402 may send an error indication to remote data processing client 402.

Processing node(s) 420 may implement query processing 422 which may perform multiple different processing operations and support multiple different data formats. For example, query processing 422 may implement separate tuple scanners for each data format which may be used to perform scan operations that scan data 432 and which may filter or project from the scanned data, search (e.g., using a regular expression) or sort (e.g., using a defined sort order) the scanned data, aggregate values in the scanned data (e.g., count, minimum value, maximum value, and summation), and/or group by or limit results in the scanned data. Remote data processing requests may include an indication of the data format for data 432 so that query processing 422 may use the corresponding tuple scanner for data 432. Query processing 422 may, in some embodiments, transform results of operations into a different data format or schema according to a specified output data format in the remote data processing request.

In some embodiments, data 432 may be stored in encrypted or compressed format. Processing node(s) 420 may implement compression engine(s) 424 to decompress data 432 according to a compression technique identified for data 432, such as lossless compression techniques like run-length encoding, Lempel-Ziv based encoding, or bzip based encoding. Processing node(s) 420 may implement encryption engine(s) 426 to decrypt data 432 according to an encryption technique and/or encryption credential, such as a key, identified for data 432, such as symmetric key or public-private key encryption techniques.

Processing node(s) 420 may implement storage access 428 to format, generate, send and receive requests to access data 432 in storage service 430. For example, storage access 428 may generate requests to obtain data according to a programmatic interface for storage service 430. In some embodiments, other storage access protocols, such as internet small computer interface (iSCSI), may be implemented to access data 432.

Figure 5:
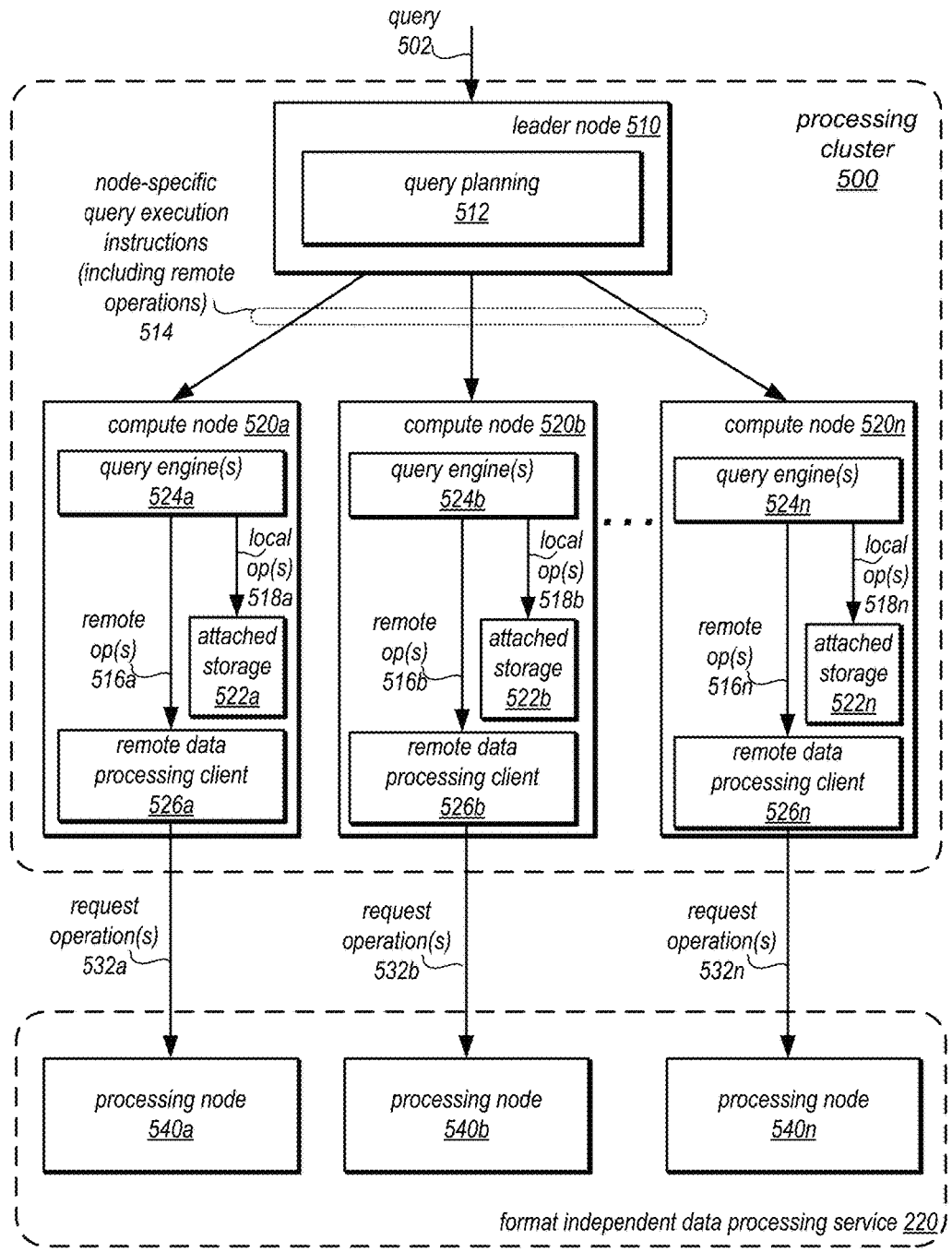
FIG. 5 is a logical block diagram illustrating an example processing cluster of a data warehouse service using a format independent data processing service to perform operations at a remote data store to execute a query, according to some embodiments.

FIG. 5 is a logical block diagram illustrating an example processing cluster of a data warehouse service using a format independent data processing service to perform operations at a remote data store to execute a query, according to some embodiments. Processing cluster 500 may be data warehouse service cluster, like processing clusters 320 discussed above with regard to FIG. 3, or another processing cluster that distributes execution of a query among multiple processing nodes. As illustrated in this example, a processing cluster 500 may include a leader node 510 and compute nodes 520*a*, 520*b*, and 520*n*, which may communicate with each other over an interconnect (not illustrated). Leader node 510 may implement query planning 512 (discussed in detail below with regard to FIG. 6) to generate query plan(s) and instructions 514 for executing queries on processing cluster 500 that perform tiered data processing. As described herein, each node in a processing cluster 500 may include attached storage, such as attached storage 522*a*, 522*b*, and 522*n*, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 500 is a leader node as illustrated in FIG. 5, but rather different nodes of the nodes in processing cluster 500 may act as a leader node or otherwise direct processing of queries to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 500 may be implemented as part of a data warehouse service, as discussed above with regard to FIG. 3, or another data processing service(s) 210. Leader node 510 may manage communications with clients, such as clients 250 discussed above with regard to FIG. 2. For example, leader node 510 may be a server that receives a query 502 from various client programs (e.g., applications) and/or subscribers (users), then parses them and develops an execution plan (e.g., query plan(s)) to carry out the associated database operation(s)). More specifically, leader node 510 may develop the series of steps necessary to obtain results for the query. Query 502 may be directed to data that is stored both locally within processing cluster 500 (e.g., at one or more of compute nodes 520) and data stored remotely (which may be accessible by format independent data processing service 220. Leader node 510 may also manage the communications among compute nodes 520 instructed to carry out database operations for data stored in the processing cluster 500. For example, node-specific query instructions 514 may be generated or compiled code that is distributed by leader node 510 to various ones of the compute nodes 520 to carry out the steps needed to perform query 502, including executing the code to generate intermediate results of query 502 at individual compute nodes may be sent back to the leader node 510. Leader node 510 may receive data and query responses or results from compute nodes 520 in order to determine a final result for query 502. A database schema, data format and/or other metadata information for the data stored among the compute nodes, such as the data tables stored in the cluster, may be managed and stored by leader node 510. Query planning 512, as discussed in more detail below with regard to FIG. 6, may account for remotely stored data by generating node-specific query instructions that include remote operations to be directed by individual compute node(s).

Processing cluster 500 may also include compute nodes, such as compute nodes 520*a*, 520*b*, and 520*n*. Compute nodes 520, may for example, be implemented on servers or other computing devices, such as those described below with regard to computer system 2000 in FIG. 11, and each may include individual query processing "slices" defined, for example, for each core of a server's multi-core processor, one or more query processing engine(s), such as query engine(s) 524*a*, 524*b*, and 524*n*, to execute the instructions 514 or otherwise perform the portions of the query plan assigned to the compute node. Query engine(s) 524 may be configured to access a certain memory and disk space in order to process a portion of the workload for a query (or other database operation) that is sent to one or more of the compute nodes 520. Query engine 524 may access attached storage, such as 522*a*, 522*b*, and 522*n*, to perform local operation(s), such as local operations 518*a*, 518*b*, and 518*n*. For example, query engine 524 may scan data in attached storage 522, access indexes, perform joins, semi joins, aggregations, or any other processing operation assigned to the compute node 520.

Query engine 524*a* may also direct the execution of remote data processing operations, by providing remote operation(s), such as remote operations 516*a*, 516*b*, and 516*n*, to remote data processing clients, such as remote data processing client 526*a*, 526*b*, and 526*n*. Remote data processing clients 526 may be implemented by a client library, plugin, driver or other component that sends request operations, such as request operation(s) 532*a*, 532*b*, and 532*n* to format independent data processing service 220. As noted above, in some embodiments, format independent data processing service 220 may implement a common network endpoint to which request operation(s) 532 are directed, and then may dispatch the requests to respective processing nodes, such as processing nodes 540*a*, 540*b*, and 540*n*. Remote data processing clients 526 may read, process, or otherwise obtain results from processing nodes, including partial results of different operations (e.g., aggregation operations) and may provide them back to query engine(s) 524, which may further process, combine, and or include them with results of location operations 518. Compute nodes 520 may send intermediate results from queries back to leader node 510 for final result generation (e.g., combining, aggregating, modifying, joining, etc.). Remote data processing clients 526 may retry operation request(s) 532 that do not return within a retry threshold. As format independent data processing service 220 may be stateless, processing operation failures at processing node(s) 540 may not be recovered or taken over by other processing nodes 540, remote data processing clients 526 may track the success or failure of requested operation(s) 532, and perform retries when needed.

Attached storage 522 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 6:
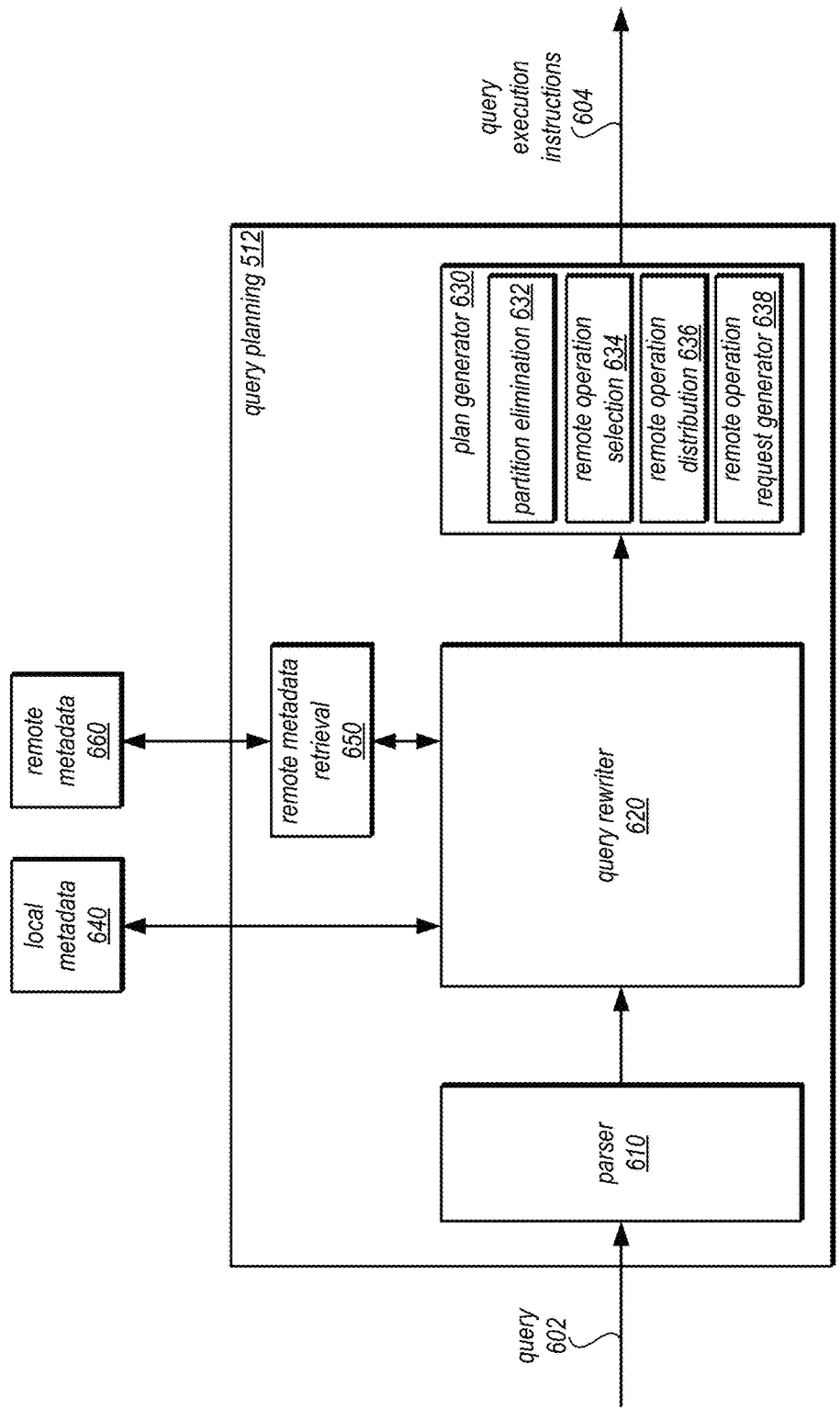
FIG. 6 is a logical block diagram illustrating an example query planning engine that generates query plans for performing tiered data processing, according to some embodiments.

FIG. 6 is a logical block diagram illustrating an example query planning engine that generates query plans for performing tiered data processing, according to some embodiments. Query planning 512 may implement parser 610 to receive a query statement, such as a SQL statement, and determine the various requested operations to perform as a result of the query. For example, parser 610 may generate a query tree for a given query input string to separate out the various query clauses, fields, predicates, conditions, commands, or other query information for planning and optimization. Query planning 512 may implement query rewriter 620 to rewrite the parsed query based on metadata that describes both the local data and remote data. For example, as illustrated in FIG. 6, query rewriter 620 may have access to local metadata 640 (e.g., table descriptions or definitions, including the names and data types of each column, physical information (e.g., partitions information), number of rows, number of distinct values, value ranges, value cardinality, value distribution, indexes, views, etc.), to rewrite portions of a query tree, such as changing the location or ordering of predicates, join operations, or other portions or operations in the query tree.

As portions of query 602 may be directed to remote data, query rewriter may rely upon metadata describing the remote data, such as remote metadata 660 (e.g., table or descriptions definitions, including the names and data types of each column, physical information (e.g., partitions information), number of rows, number of distinct values, value ranges, value cardinality, value distribution, indexes, views, etc.), to perform query rewrites to optimize execution of portions of the query with respect to remotely stored data. While a client of the processing cluster could provide remote metadata 660 (e.g., as query hints), in some embodiments query planning 512 may implement remote metadata retrieval 650 which may request remote metadata 660 from different sources.

For example, remote metadata may be stored as part of an external data catalog service. When parser 610 parses query 602, a check may be performed to see if metadata for the referenced data in query 602 is found in local metadata. Such a check could be performed in different ways. In one embodiment, syntax within query 602 could identify the data (e.g., table) as remote (e.g., SELECT from table_name AT <remote_location_string>), indicating that the metadata for the table is also remote. In another embodiment, an alias for the remote data may be created within local catalog data that points to a remote endpoint (e.g., network address) for the remote table. In another embodiment, a schema alias may be created for the remote metadata (e.g., within schema level information "create a remote schema "rschema" for "remote_endpoint/schema"" and then reference the table from the remote metadata service using a qualified name). In another embodiment, a table alias can be created for a table defined on a remote database or metadata service (e.g., "create external table t1 ( . . . ) server remote-location-url"). If metadata is not local, remote metadata retrieval 650 may send a request to a remote data source, such as a metadata service or another service storing the remote data (e.g., to a database service or object storage service storing the data). In some embodiments, query 602 may include references to remote data according to a default schema name that may allow for the check in local metadata 640 to be skipped and a request for remote metadata 660 sent. Query rewriter 620 may perform similar rewrite operations as discussed above with respect to operations or portions of the parsed query to be executed remotely at format impendent data processing service 220, such as changing the location or ordering of predicates, join operations, or other portions or operations in the query tree.

The rewritten query may then be provided to plan generator 630. Plan generator 630 may perform various operations to generate a query execution plan (e.g., a tree of plan operation nodes, which may be later used to generate query execution code). For example, plan generator may perform a cost-based optimization to select one of various combinations or orderings of plan operator nodes in a tree produces a more efficient plan to execute. Plan generator 630 may also implement partition elimination 632, which may use local 640 or remote 660 metadata to filter out partitions (e.g., portions of or entire data objects) from evaluation for executing the query. For example, partition elimination 632 may receive a list of predicates as part of query 602 and along with a list of partitions (for local and/or remote data)

along with range values or other information describing the values stored within the partitions. If an evaluation of a predicate compared with the range values or other value description information were to exclude that partition from satisfying the query predicate (e.g., values in the partition are out of a range for the predicate), then operations to evaluate (e.g., scan) the partition may be removed. In scenarios where the partitions removed are partitions of remote data, in addition to saving processing costs, removal of partitions would save transmission costs (e.g., network bandwidth) to move results from remote data.

Although not illustrated, plan generator 630 may also evaluate query predicates to skip or prune portions of the query execution plan, in some embodiments (in addition to or instead of pruning or skipping portions of data, as discussed above). For example, if a table is partitioned by certain column and a query contains range predicates on the partition columns, plan generator 630 can eliminate those partitions that do not satisfy the predicate as early as possible. If, for instance, the predicates on the partition column matches a pattern of "column operator constant" and the operator is a comparison operator (e.g., =, <, >, <=, >=, <), then plan generator 630 can eliminate those partitions that do not satisfy the predicates at planning time. If the predicate on partition column is a join predicate that compares an input parameter which can only be evaluated at execution time, then plan generator 630 generate a partition elimination plan which will be executed before a scan of a partitioned table to skip those unqualified partitions.

Plan generator 630 may also implement remote operation selection 634 to assign the performance of different operations for remote data processing. For example, as noted above, remote data processing operations may include operations that scan operations that filter or project data results, aggregation operations that aggregate data values and provide partial or complete aggregation results, sorting, grouping, or limiting operations that organize or reduce the determined data results from remote data. FIGS. 7A-8B, discussed below provide different examples of remote operation selection 634 that may be performed. More generally, remote operation selection 634 may apply various rules-based selection techniques to determine which operations should be pushed down or assigned for remote data processing at format independent data processing service. In some embodiments, modifications to a query plan may be implemented or performed dynamically based on intermediate results from previously executed portions of the query plan. For example, conditional statements or other logical operators may be included in the query plan that indicate which operation to perform locally or direct remotely based on the intermediate results of previously performed operations.

Some operations may be partially performed. For example, aggregation operations, may not be completed before results are transmitted to the compute node. Instead, the compute node may aggregate a stream of partial results (e.g., as discussed with regard to FIG. 9 below) to determine the complete aggregation results for the remote aggregation operation. Then, the compute node perform operations to combine or otherwise process the aggregation results with other operations performed by the compute node (e.g., local data processing operations) and provide both remote and local processing results to a leader node for global aggregation across all compute nodes in the processing cluster. Remote operation selection 634 may implement greedy selection algorithms to select operations for remote data processing. However, in some embodiments, remote operations election 634 may decline to push or assign operations for remote processing that could be pushed or assigned based on a cost analysis. For example, depending on the cardinality of an aggregation operation (e.g., number of results for values being aggregated), assigning partial aggregation operation may not be beneficial. If the number of result values is large, then remote processing aggregation may not beneficial as the problem size for executing the aggregation would not be reduced if performed remotely, wasting processing, memory, or other resources.

As part of assigning operations for remote processing remote operation selection 634 may modify the query plan to include data plan operation nodes that correspond to assigned operations. For example, remote operation selection 634 may insert a plan node that represents scanning operations to be directed by a compute node (e.g., compute node 520) and performed at a processing node (e.g., processing node 540) part of a subquery for executing the query. This remote scanning node may identify which operations are assigned for remote execution and may be annotated with a corresponding interface command to execute the operation remotely (e.g., a format independent data processing service 220 API) as well as specific data that should be scanned (e.g., partition, file, table, or other data object identifiers). The remote scanning node may include predicates, regular expressions or other information for projections, filters, or limitations (e.g., a SQL limit clause) to be applied as part of the scan operation. Another example of a plan node for a remote operation may be a remote aggregation plan node. Different types of associative aggregation operations (e.g., count, minimum value, maximum value, average, summation, deviation, or other statistical calculations) may be identified by the aggregation operation plan node. A grouping indication (e.g., a SQL group by clause) may identify the associate values over which aggregation functions are applied.

Plan generator 630 may implement remote operation distribution 636 to determine which compute nodes may direct (e.g., request and process returned results) remote data processing operations. For example, in at least some embodiments a round-robin distribution scheme may be implemented to ensure that each compute node handles fair share of remote data processing workload. Distribution schemes may account for the number of data objects to be evaluated or the size of data objects to be evaluated when distributing remoter data processing operations.

Plan generator 638 may implement remote operation request generator 638. In some embodiments, remote operation request generator 638 may populate a template, message, request, or other data structure for directing remote data processing operations. A remote data processing client, such as remote data processing clients 526 in FIG. 5, may interpret, access, or utilize the data structure to send remote data processing requests to format independent data processing service. In some embodiments, plan generator 630 may generate query execution code or other execution instructions 604 to perform the query plan. The query execution instructions 604 may access data structures generated for remote operation requests to generate code for executing remote data processing operations, in some embodiments.

Figures 7A, 7B:
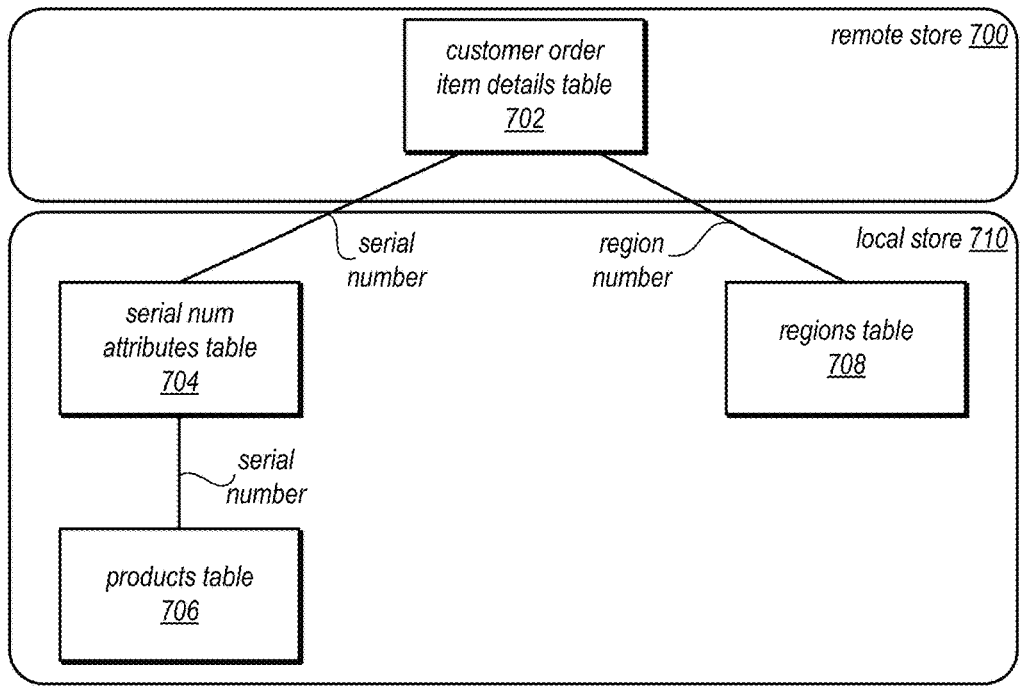
FIG. 7A is an example data set for performing tiered data processing to execute a query that is distributed between local and remote data storage, according to some embodiments.
FIG. 7B is an example query directed to a data set that is distributed between local and remote data storage, according to some embodiments.

Generating plans to execute tiered data processing for distributed data sets may allow for many different opportunities to minimize the data that is transferred from a remote data processing engine, such as a processing node of format independent data processing service 220 and remote data processing client, such as a processing cluster 500. FIG. 7A is an example data set for performing tiered data processing to execute a query that is distributed between local and remote data storage, according to some embodiments. For example, a remote store 700 may store table, customer order item details table 702. Customer order item details table may include various information such as a serial number for each item ordered, a quantity of the item ordered, a price of the item ordered, a product group for the item, a region that the item was ordered from/shipped to, partition columns, year ordered, month ordered, and data ordered. Other tables may also be maintained local to a data processing engine, such as serial number attributes table 704, products table 706, and regions table 708 in local store 710. Common keys shared between customer order items table 702 and serial number attributes table 704 and products table 706 may be "serial number," while customer order item details table 702 may share "region number" keys with regions table 708.

Consider a scenario in which an author, JK Rowling is launching another book in the Harry Potter series. A marketer for the publisher may want to examine which locations within a given region (e.g., Austin, Tex.) to place billboards. A query may be constructed with respect to the tables illustrated in FIG. 7A to determine which regions within Austin had most improved sales based on past marketing campaigns. FIG. 7B illustrates an example query that may return results useful for such an analysis. This query, query 730, may be provided to a data processing engine, like processing cluster 500, which may parse, rewrite, and generate a query plan to perform data processing operations with respect to data in local store 710 and remote store 700.

Figure 8A:
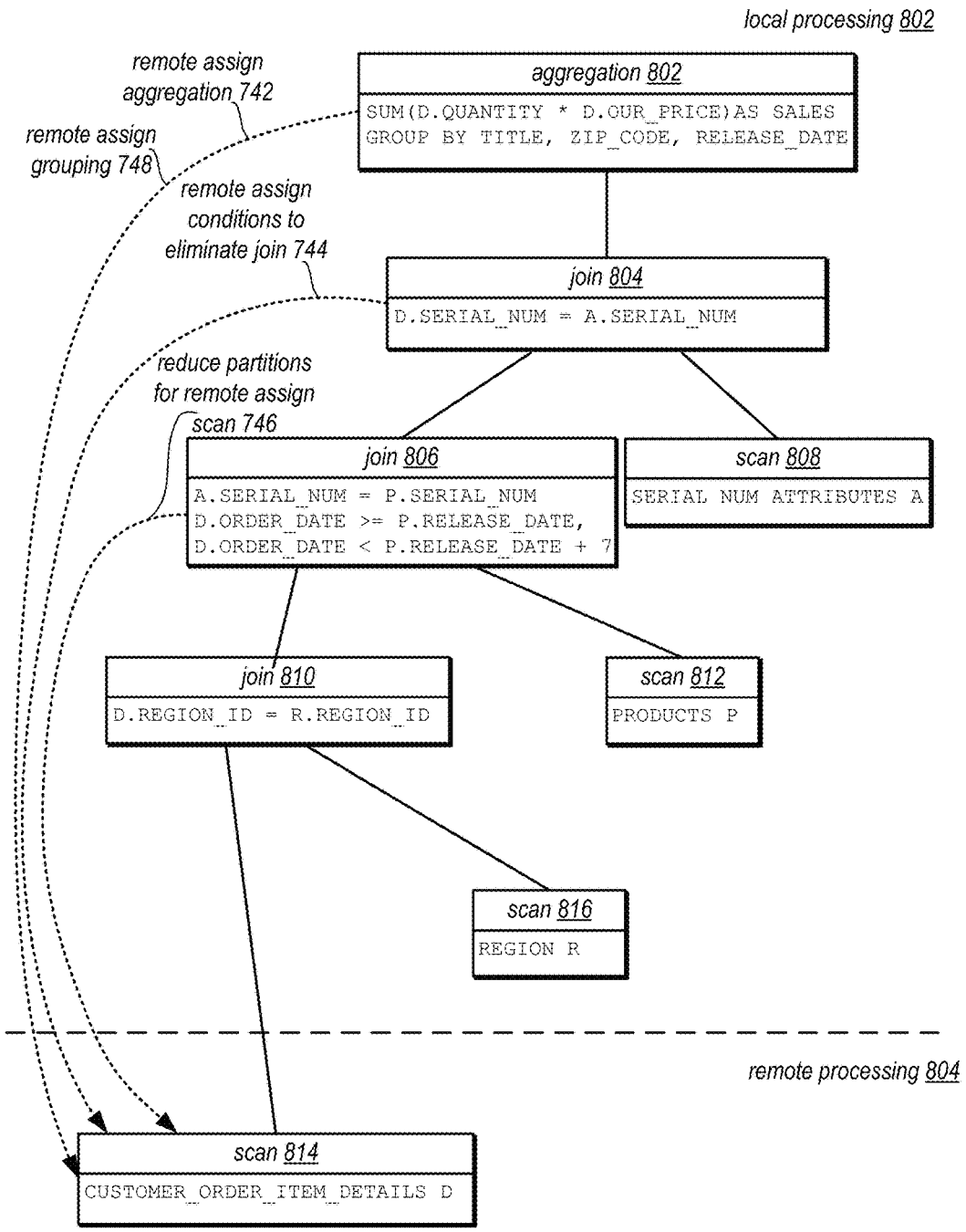
FIG. 8A is an example query plan for executing tiered data processing, according to some embodiments.

Query planning may be performed to select, determine, or identify operations that should be assigned for execution at remote data processing engine(s). FIG. 8A is an example query plan for executing tiered data processing, according to some embodiments, that may be initially generated for query 730. The root operation, aggregation operation 802 may be assigned to local processing 802 (e.g., by one or more compute nodes 520) to perform a summation aggregation on sales quantity and price that groups the aggregate results by title, zip code and release date. The next operation, join operation 804, may be performed to join customer order item details table 702 ("D") with serial number attributes table 704 ("A"). Scan operation 808 may perform a scan of serial number attributes table 704 that is joined with the results of join operation 806 (which joins the results of scan operation 812 of products table 706 and join operation 810) and applies predicates for results up to seven days after the release date. Join operation 810 may join the results of scan operation 816 of regions table 708 and remote scan operation 814 of customer order item details table 702. Remote scan operation 814, may be performed by remote processing 804 (e.g., by one or more scan operations performed against one or more partitions of customer order item details table 702) by performing one or more processing nodes 540 in format independent data processing service 220.

Figure 8B:
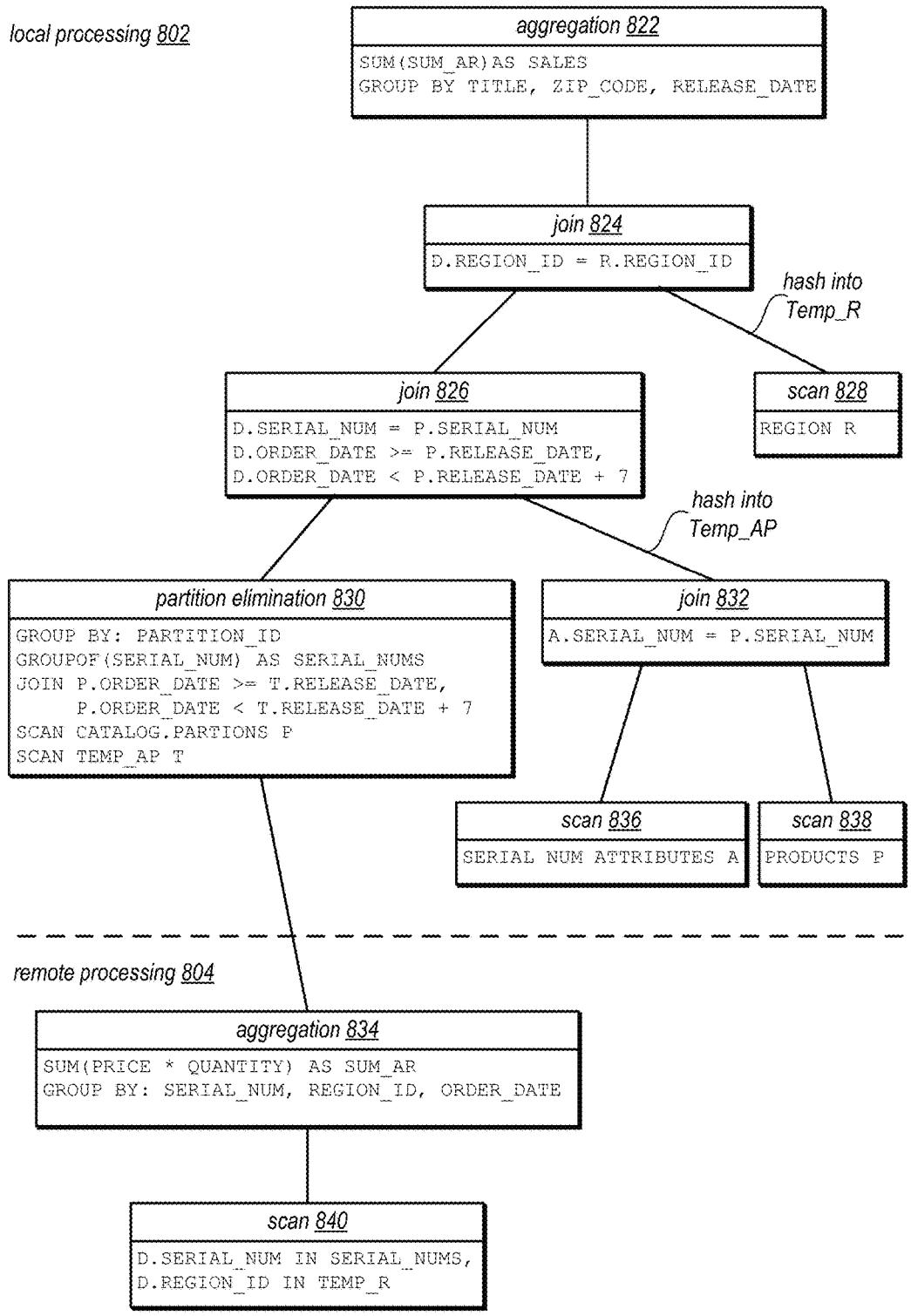
FIG. 8B is an example modified query plan for executing tiered data processing, according to some embodiments.

Query planning may apply different rules or other recognition techniques to change, modify, rewrite, or reassign operations to remote processing 804. For example, query planning may reorder join operations. Consider a scenario, where the intermediate results that may be generated by each join operation according to the order specified by an initial parsing of query are evaluated according to size. The join operations may then be re-ordered so that the order of join operations yields the smallest intermediate results for join operations (as intermediate result size may change depending upon the order of processing). Additionally, the evaluation may minimize the amount of data that is retrieved from remote data. Various statistics in remote and local metadata may be used to determine or approximate the intermediate results for join operations, in some embodiments. FIG. 8B is an example modified query plan for executing tiered data processing, according to some embodiments, which illustrates a modified ordering of join operations. For example, join operation 824 is a join operation that joins the results of a scan operation 828 of regions table 708 with join 826, below aggregation operation 822, moving up the scan operation of regions table 708 to a different location than in FIG. 8A (where it is part of the last join operation 810). Join operation 832, which joins the results of scan operation 836 and scan operation 838, may be moved down from below the root aggregation operation 802 to after join operation 826.

Another example of a query plan modification is pushing or reassigning an aggregation operation to remote data processing 804. Pushing down an aggregation operation (as illustrated by query portion 742 in FIG. 7B and FIG. 8A), such as aggregation operation 802 to aggregation operation 834 in FIG. 8B. that performs a summation aggregation operation that sums quantities and price. In some embodiments, the aggregation operation may provide partial aggregation results. Pushing down aggregation may reduce the amount of data that needs to be sent back from the remote data store to the data processing engine. Instead of returning all rows for each object scanned from a remote data store, for instance, smaller, aggregated subset of rows may be returned. Similar operations, such as filtering items, projecting items, or other operations, such as sorting operations may be pushed down. For example, the group by clause in query 730 may be remotely assigned 748 (as indicated by the remote assignment arrow from aggregation operation 802 to scan operation 814). In FIG. 8B, the group by clause may be performed as part of aggregation operation 834.

Another example of a query plan modification may be pushing or reassigning predicates or other filters to reduce a join operation. Consider the ordering of operations in a query plan that would first hash tables of results for two joins above it. Based on the cardinality (e.g., unique values) of the intermediate results, a query plan modification could dynamically push filters, which consist of values in the intermediate results, to a scan operation to be assigned to remote processing 804. For example, in the query in FIG. 7B, the regions data is filtered according to predicates that satisfy country, state, and city values of "Austin" "TX" and "US" respectively. These filter conditions could be pushed down (as indicated by element 744) to reduce the amount of results returned from customer order item details table 702) and thus join as part of join operation 804. For example, in FIG. 8B, filter predicates of region identifier determined by the intermediates results of scan operation 828 can be pushed down to scan operation 840, so that the aggregation 834 is only performed upon those rows that are found in the temporary results (e.g., "D.REGION_ID IN TEMP_R").

Another example of a query plan modification may be dynamically removing partitions. For example, as noted above customer order item details table 702 may be partitioned by YEAR, MONTH, and DAY. If the data were to be stored for a long period of time (e.g., a 20 year period) to execute query 730, all approximately 7300 partitions (20 years*365 days) would have to be scanned. However, query 730 includes a predicate that selects orders within a 7 day release date of an item, as indicated at 746. Query planning may include a join operation that identifies the serial numbers of products within the seven day release data range in an intermediate result (e.g., hashed into TempAP) with the partitions table to produce a set of matching partition identifiers. Query planning could also associate serial numbers found in each partition so that it can even further restrict the join reduction on the scan operations of remote data. Scan operations may be modified to be performed on items in partitions found in the set of partitions within the 7 day range from the release date identified in the intermediate result (TempAP), as indicated at 746 in FIG. 8A, by including partition elimination operation 830 to eliminate partitions for aggregation operation 834 and scan 840. In this way, modifying the query plan to eliminate partitions may reduce the amount of data that needs to be scanned by a large factor (e.g., as only 49 (7 days*7 books) out of 7300 partitions may need to be read).

Please note that the previous examples are some of the many combinations operations that may be pushed down or assigned to remote data processing, and thus are not intended to be limiting. In other circumstances different modifications can be achieved. For example, join operations may be removed entirely from a query plan by pushing down filter operations to remote data processing that return results that would accomplish the removed join operation.

Figure 9:
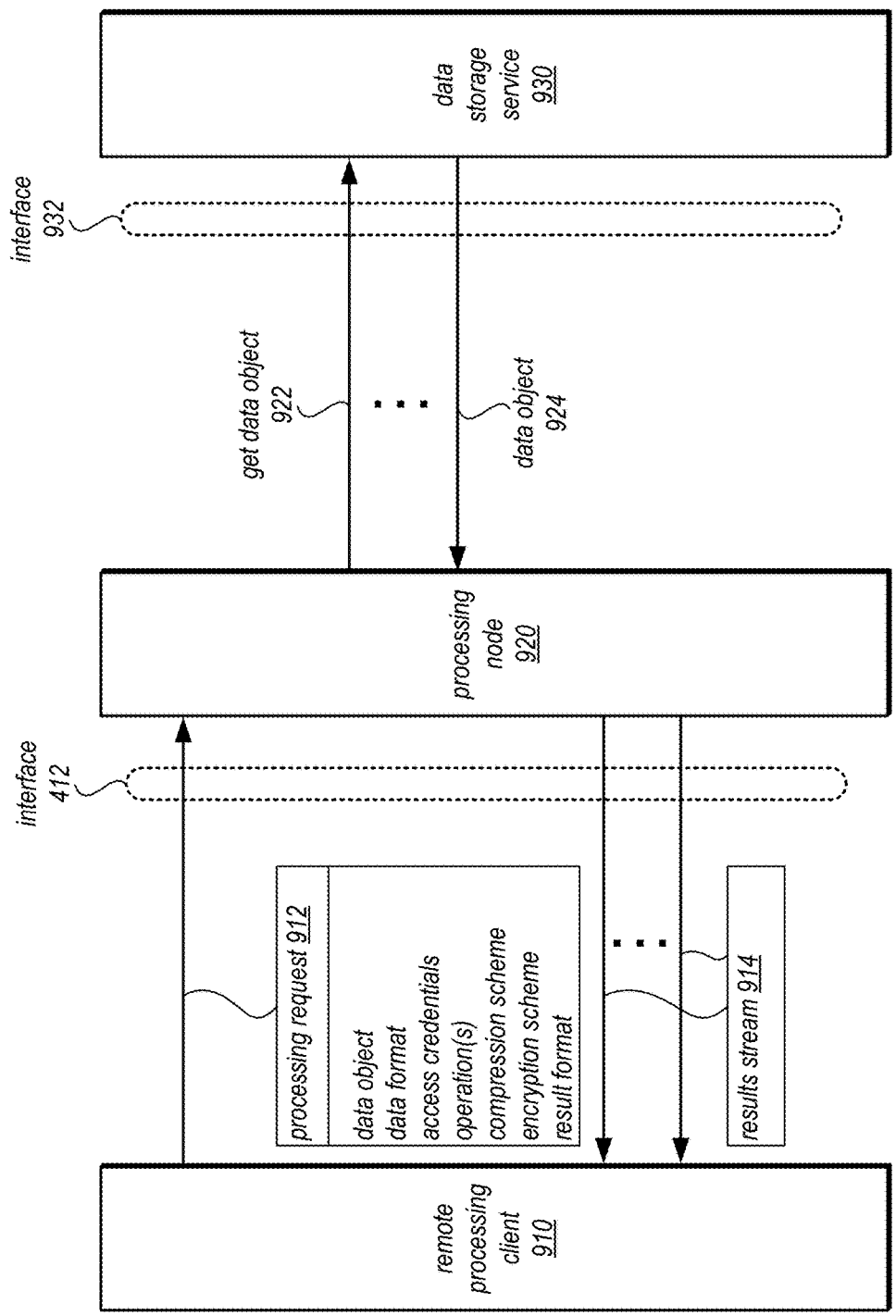
FIG. 9 is a logical block diagram illustrating interactions between a remote processing client and a processing node of format independent data processing service to execute a processing request, according to some embodiments.

FIG. 9 is a logical block diagram illustrating interactions between a remote processing client and a processing node of format independent data processing service to execute a processing request, according to some embodiments. Remote processing client 910 may be a data processing engine implemented by a single node (e.g., a single database server) or multiple nodes (e.g., a data processing cluster like processing cluster 500 in FIG. 5). Remote processing client 910 may be an external data processing engine (single node or cluster of nodes) operating external to provider network 200. For example, an organization may implement database systems that process local data within a private network. Older data may be stored remotely in a data storage service in provider network 200. The external data processing engine may then execute queries that target both local data within the private network and data stored in the provider network by sending processing requests 912 to format independent data processing network 220 which may be performed by processing node 920. In this way, cold or infrequently accessed data stored separately may still be accessible to queries.

Remote processing client 910 may send processing request 912 via interface 412 (e.g., an API) which may be dispatched (load balancing and/or other front-end processing components that dispatch requests not being illustrated) to processing node 920. Processing request 912 may include various kinds of information to perform the remote processing information. For example, processing request 912 may include an identifier for the data object (e.g., a key value, a filename, a partition or table id, etc.). Processing request 912 may include the data format or schema (e.g., a type of column-oriented data format such as Optimized Row Columnar (ORC) or Parquet, a type of semi-structured data such as Comma Separated Values (CSV) or Extensible Markup Language (XML), etc.) in which the data is stored in remote data storage service 930. In some embodiments, processing request 912 may include access credentials (e.g., a token, username and password, etc.) as well as an identification of an encryption scheme according to which the data object is stored and/or a compression scheme according to which the data object is stored. Processing request 912 may specify the operation(s) to perform partial or full (e.g., scanning operations including predicates, regular expressions or other information for projections, filters, or limitations, aggregation operations that count or determine minimum values, maximum values, averages, summations, deviation, or other statistical calculations, or groupings, sort orders, or other indications that determine how results are to be combined, calculated or presented). Processing request 912 may include a result format which may be different than the format that the data is stored in data storage service 930 (e.g., convert data from CSV to ORC).

Figure 10:
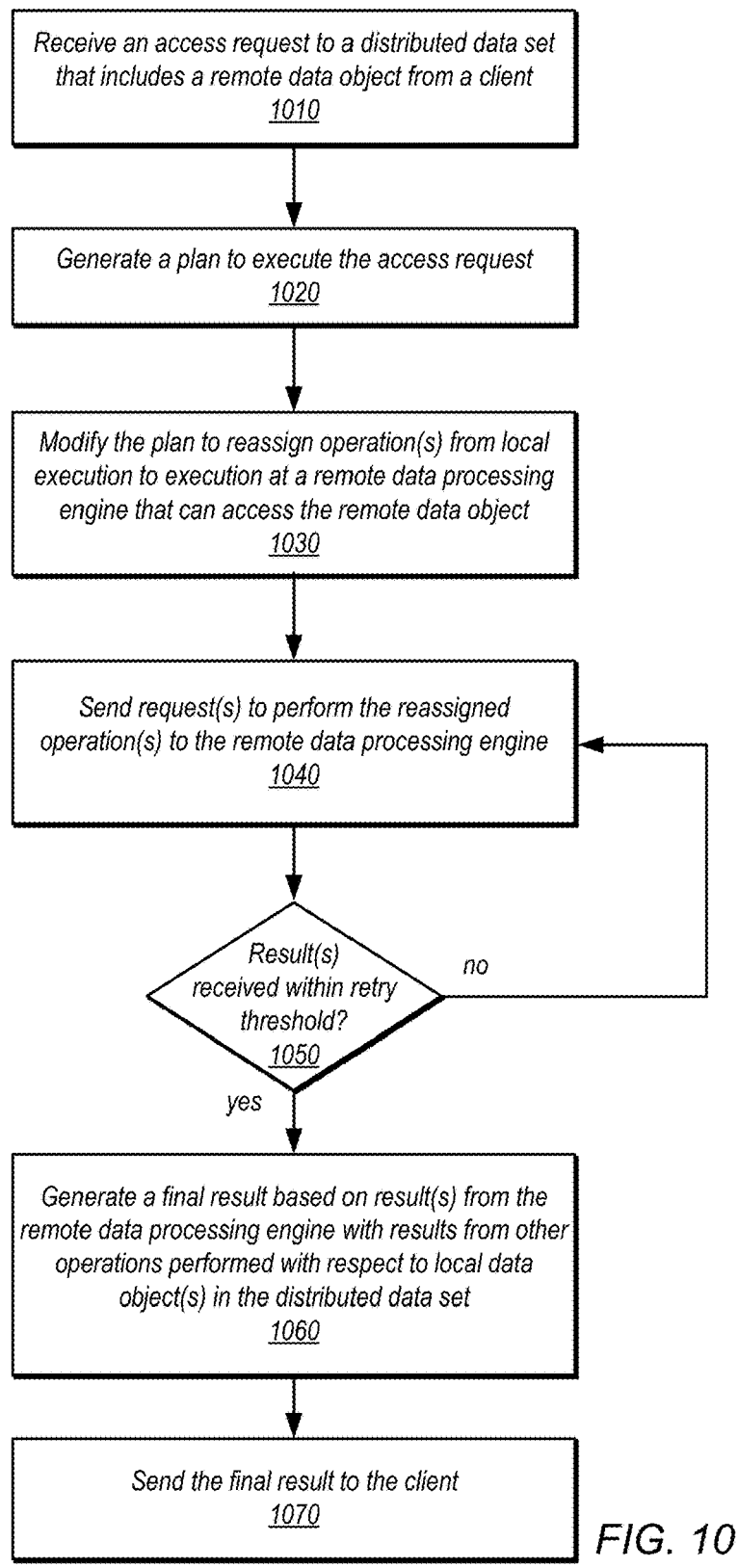
FIG. 10 is a high-level flowchart illustrating methods and techniques to perform tiered data processing for distributed data, according to some embodiments.

Processing node 920 may perform one or more multiple requests 922 get and return objects 924 from data storage service 930. These requests may be formatted according to an interface 932, such as an API. Once the data objects (or portions of the data objects) are retrieved 924, processing node may perform the requested operations. Processing node 920 may provide results as a stream 914 to remote processing client 910. For example, processing node 920 may perform data processing in memory and therefore may have limited capacity to store intermediate or incomplete results (e.g., aggregation results). Processing node 920 may send intermediate results as part of results stream. Results stream may also be a stream of filtered, projected, sorted, or other data values as requested in processing request 912. If processing node 920 fails before or during processing of the request 912, remote processing client 910 may retry the request Although FIGS. 2-9 have been described and illustrated in the context of a provider network implementing different data processing services, like a data warehousing service, the various components illustrated and described in FIGS. 2-9 may be easily applied to other data processing systems that perform remote data processing on behalf of clients. As such, FIGS. 2-9 are not intended to be limiting as to other embodiments of remote data processing for distributed data. FIG. 10 is a high-level flowchart illustrating methods and techniques to perform tiered data processing for distributed data, according to some embodiments. Various different systems and devices may implement the various methods and techniques described below, either singly or working together. For example, a processing cluster, such as described above with regard to FIG. 5, may be configured to implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 1010, an access request may be received that is directed to a distributed data set. The distributed data set may include both local data objects and remote data objects. The access request may be directed to a remote data object. Access requests may be a query or other request to initiate data processing operations that access the distributed data set and return a result. For example, a structured query language (SQL) statement may be received that includes a SELECT clause to a projection of data from multiple database tables that satisfy various predicates or conditions in a WHERE clause.

As indicated at 1020, a plan may be generated to execute the access request. A plan may include generating, ordering, and otherwise initially determining the operations to be performed in order to execute the request. For example, an access request may result in perform operations that join data from multiple data objects together and filter out portions (e.g., rows, fields, or attributes) of data objects that do not satisfy predicate values. The generated plan may be represented as a query tree or set of plan operation nodes (as discussed above with regard to FIG. 6).

The plan may be modified to reassign operations from local execution to execution at a remote data processing engine that can access the remote data object, as indicated at 1040. For example, different processing operations, such as filtering operations, aggregation operations, or join operations may be initially assigned or determined for execution locally (e.g., by one or more nodes in a processing cluster). Different optimization rules may be applied to the plan to identify reassignments that would lower the execution cost of the access request. For example, reassignment of aggregation operations may be performed to lower the amount of data transmitted back from the remote data processing engine. As discussed above with regard to FIGS. 6-8B, different reassignments may be determined in different scenarios, such as reassigning predicate filters, grouping, limitations, sortation's, or other result manipulation operations. Modification may include reordering, adding, or removing operations. Cost-based modification schemes may weigh the query execution costs for different combinations of reassigning operations to local and remote data processing in order to make reassignments. Modifications may result in reassignments that are dynamically determined. For example, the modification may insert a conditional operation that is to be execute remotely if an evaluation of intermediate results that are locally execute satisfies reassignment conditions for remote execution.

As indicated at 1040, request(s) to perform the reassigned operation(s) may be sent to the remote data processing engine. For example, requests may be execution code or instructions that are locally generated and sent to be performed by a remote data processing engine without further execution planning on the part of the remote data processing engine. Instead, the remote data processing engine may access the specified data object in the request and perform the execution code or instructions. Requests may include various information, such as the data object to be processed, the format of the data object, credentials to access the data object, the type of operation to perform, a compression scheme, an encryption scheme, and or a result format.

In at least some embodiments, the remote data processor may be a stateless data processor. Failure scenarios may be handled locally. For example, as indicated at 1050 a determination may be made as to whether results for the operation are received within a retry threshold. A stream of results, such as partial results discussed above at FIG. 9, may exceed the retry threshold if time elapsed since a last received result that did not indicate completion of the operation exceeds the retry threshold. If the result(s) are note received within the retry threshold, then the requests may be sent to the remote data processing engine or a different remote data processing engine, as indicated by the negative exit from 1050.

As indicated at 1060, a final result may be generated for the access request based on results received for the reassigned operations from the remote data processing engine as well as results of local data processing operations. Various other processing operations may be performed as part of executing the plan for the access request in order to generate the final result (e.g., performing other join operations, calculations, manipulations, filtering, grouping, etc.). Once generated, the final result may then be sent to the client, as indicated at 1070.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of tiered data processing for distributed data as described herein may be executed on one or more computer systems, which may interact with various other devices. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 11, memory 2020 may include program instructions 2025, configured to implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a local data store, that stores one or more data objects of a distributed data set;
one or more compute nodes, respectively comprising at least one processor and a memory, storing program instructions that when executed cause the one or more compute nodes to perform a method, comprising:
receiving, from a client a query directed to the distributed data set, wherein at least one data object of the distributed data set is stored in a data store that is remote to a data processing engine;
generating a query plan to execute the query, wherein the query plan comprises a plurality of different query operations;
modifying the query plan to include a command directed to an interface for a remote data processing engine, wherein the command corresponds to a query operation of the plurality of different query operations and wherein the command causes performance of the query operation at the remote data processing engine as part of reassigning the query operation from local execution at the one or more computing devices to the remote data processing engine, wherein the remote data processing engine can access the data object in the remote data store to execute the query operation;
directing execution of the different query operations, comprising sending a request to the remote data processing engine to execute the command to perform the reassigned query operation;
generating a final result for the query based, at least in part, on one or more results of the reassigned query operation received from the remote data processing engine with a result for another one of the different operations determined by the one or more compute nodes with respect to the one or more data objects in the local data store; and
sending the final result for the query to the client.

2. The system of claim 1, wherein the at least one data object stored in the remote data store is stored in a data format that is not supported by the data processing engine, and wherein the remote data processing engine supports the data format of the at least one data object stored in the remote data store.

3. The system of claim 1, wherein the reassigned operation comprises a scan operation that scans the at least one data object in the remote data store and sends filtered results to the data processing engine according to a predicate included in the query.

4. The system of claim 1, wherein the one or more compute nodes are a processing cluster implemented as part of a data warehouse service in a provider network, wherein the remote data processing engine is implemented as part of a format independent data processing service in the provider network, and wherein the client is a client of the provider network configured to send the query to the processing cluster via a network-based interface for the data warehouse service.

5. A method, comprising:
performing, by one or more computing devices:
receiving, from a client, a query directed to a distributed data set, wherein a data object of the distributed data set is stored in a data store that is remote to the one or more computing devices, wherein at least another one of the data objects is stored in a data store that is local to the one or more computing devices;
generating a query plan to execute the query, wherein the query plan comprises a plurality of different query operations;
modifying the query plan to include a command directed to an interface for a remote data processing engine, wherein the command corresponds to a query operation of the plurality of different operations and wherein the command causes performance of the query operation at the remote data processing engine as part of reassigning the query operation from local execution at the one or more computing devices to the remote data processing engine, wherein the remote data processing engine can access the data object in the remote data store to execute the query operation;

sending a request to the remote data processing engine to execute the command to perform the reassigned query operation; and generating a final result for the query based, at least in part, on one or more results of the reassigned query operation received from the remote data processing engine and a result for another one of the different operations determined by the one or more computing devices with respect to the at least one other data object; and sending the final result for the query to the client.

6. The method of claim 5, further comprising obtaining metadata describing the data object stored in the remote data store and wherein generating the query plan or modifying the query plan is based, at least in part, on the metadata.

7. The method of claim 5, wherein the data object stored in the remote data store is stored in a data format that is not supported by the data processing engine and wherein the remote data processing engine supports the data format of the data object in the remote data store.

8. The method of claim 5,
wherein the plurality of different operations comprise a plurality of join operations;
wherein the method further comprises reordering one or more of the join operations in the query plan; and
wherein the query operation is identified based, at least in part, on the reordered one or more join operations.

9. The method of claim 5, wherein the reassigned query operation comprises a scan operation that scans the data object stored in the remote data store and sends filtered results according to a predicate included in the query.

10. The method of claim 5, wherein the reassigned query operation comprises an aggregation operation that applies an aggregation function to one or more data values in the remote data object.

11. The method of claim 5,
wherein one or more other data objects in the distributed data set are stored in the remote data store or another remote data store, wherein other query operations of the different query operations are reassigned from local execution to execution at one or more other remote data processing engines that can access the one or more other remote data objects;
wherein the method further comprises sending respective requests to the one or more other remote data processing engines to execute respective commands to perform the other reassigned query operations; and
wherein the final result is further based on one or more other results for the other reassigned query operations received from the one or more other remote data processing engines.

12. The method of claim 5, further comprising:
prior to the generating:
determining that a time period for receiving a result for at the reassigned query operation exceeds a retry threshold; and
resending the request to the remote data processing engine or a different remote data processing engine that can access the data object in the remote data store to perform the query operation.

13. The method of claim 5, wherein the remote data processing engine is a network-based service, and wherein sending the request to execute the command to perform the reassigned operation comprises generating the request according to a programmatic interface for the network-based service.

14. A non-transitory, computer-readable storage medium, storing program instructions that when executed by one or more computing devices cause the one or more computing devices to implement:
receiving a query from a client, wherein the query is directed to a distributed data set, wherein at least one data object in the distributed data set is stored in a data store that is remote to the one or more computing devices;
generating a query plan that comprises a plurality of different query operations to execute the query;
modifying the query plan to include a command directed to an interface for a remote data processing engine, wherein the command corresponds to a query operation of the plurality of different operations and wherein the command causes performance of the query operation at a remote data processing engine as part of reassigning of the query operation from local execution at the one or more computing devices to the remote data processing engine that can access the data object in the remote data store;
sending a request to execute the command to perform the reassigned query operation to the remote data processing engine;
generating a final result for the query based, at least in part, on one or more results of the reassigned query operation received from the remote data processing engine and a result for another one of the different operations determined by the one or more computing devices with respect to another data object in the distributed data set stored in a data store that is local to the one or more computing devices; and
sending the final result for the query to the client.

15. The non-transitory, computer-readable storage medium of claim 14, further comprising obtaining metadata describing the data object stored at the remote data store, wherein generating the query plan or modifying the query plan is based, at least in part, on the metadata.

16. The non-transitory, computer-readable storage medium of claim 14, wherein the remote data object is stored in a data format that is not supported by the data processing engine, wherein the remote data processing engine supports the data format.

17. The non-transitory, computer-readable storage medium of claim 14, wherein the reassigned query operation comprises a scan operation that scans the remote data object, projects results from the remote data object, and sends the projected results to the data processing engine according to a projection included in the query.

18. The non-transitory, computer-readable storage medium of claim 14, wherein the one or more different operations comprise an aggregation operation that applies an aggregation function to one or more data values in the remote data object, and wherein the program instructions cause the one or more computing devices to implement:
receiving from the remote data processing engine a plurality of partial results for the aggregation; and
combining the plurality of partial results into a single aggregation result for the aggregation operation, wherein the single aggregation result is one of the one or more results of the reassigned query operation.

19. The non-transitory, computer-readable storage medium of claim 14, wherein, in modifying the query plan to reassign execution of the query operation, the program instructions cause the one or more computing devices to implement:

identifying one or more partitions of the remote data object as excluded from the assigned query operation according to a predicate included in the query.

20. The non-transitory, computer-readable storage medium of claim 14, wherein the one or more computing devices are implemented as a processing cluster of a relational data warehouse service in a provider network, wherein the remote data processing engine is implemented as part of a format independent data processing service in the provider network, and wherein, in sending the request to execute the command to perform the query operation, the programming instructions cause the one or more computing devices to implement, generating the request according to a programmatic interface for the format independent data processing service.

* * * * *